US005463416A

United States Patent [19]

Paton et al.

[11] Patent Number: 5,463,416

[45] Date of Patent: Oct. 31, 1995

[54] REDUCED NOZZLE VISCOUS IMPEDANCE

[75] Inventors: Anthony D. Paton, Cambridge, England; Jurgen M. Kruse, Tucson, Ariz.

[73] Assignee: XAAR Limited, Cambridge, England

[21] Appl. No.: 90,050

[22] PCT Filed: Jan. 10, 1992

[86] PCT No.: PCT/GB92/00054

§ 371 Date: Sep. 13, 1993

§ 102(e) Date: Sep. 13, 1993

[87] PCT Pub. No.: WO92/12014

PCT Pub. Date: Jul. 23, 1992

[30] Foreign Application Priority Data

Jan. 11, 1991 [GB] United Kingdom .................... 9100613

[51] Int. Cl.[6] .................................................... G01D 15/18

[52] U.S. Cl. ............................... 347/100; 347/94; 347/95

[58] Field of Search ............................... 347/100, 69, 65, 347/94, 95

[56] References Cited

U.S. PATENT DOCUMENTS

| | | | |
|---|---|---|---|
| 4,290,072 | 9/1981 | Mansukhani | 347/20 |
| 5,112,398 | 5/1992 | Kruse | 106/20 |

FOREIGN PATENT DOCUMENTS

| | | |
|---|---|---|
| 214855A2 | 3/1987 | European Pat. Off. . |
| 278589A1 | 8/1988 | European Pat. Off. . |
| 375147A3 | 6/1990 | European Pat. Off. . |
| 403272A1 | 12/1990 | European Pat. Off. . |
| 2-111554 | 4/1990 | Japan . |
| 2-191684 | 7/1990 | Japan . |

*Primary Examiner*—Benjamin R. Fuller
*Assistant Examiner*—Valerie Ann Lund
*Attorney, Agent, or Firm*—Marshall, O'Toole, Gerstein, Murray & Borun

[57] ABSTRACT

A method of operating a pulsed droplet deposition apparatus, e.g. a drop-on-demand ink jet printer, having a droplet liquid chamber (16) with which a nozzle (18) communicates for expulsion of droplets (12) from the chamber, droplet liquid replenishment means (20) connected to the chamber and energy pulse applying means for imparting pulses of energy to the droplet liquid in the chamber, employs, to increase the volume of droplets expelled by respective energy pulses, a droplet liquid having high viscosity at low shear rate and low viscosity at high shear rate, the liquid relaxation time constant being of the same order or greater than the period of pulses applied to the liquid and the characteristic time of the liquid in the nozzle being of the same order or less than the period of the pulses.

8 Claims, 3 Drawing Sheets

FIG. 1
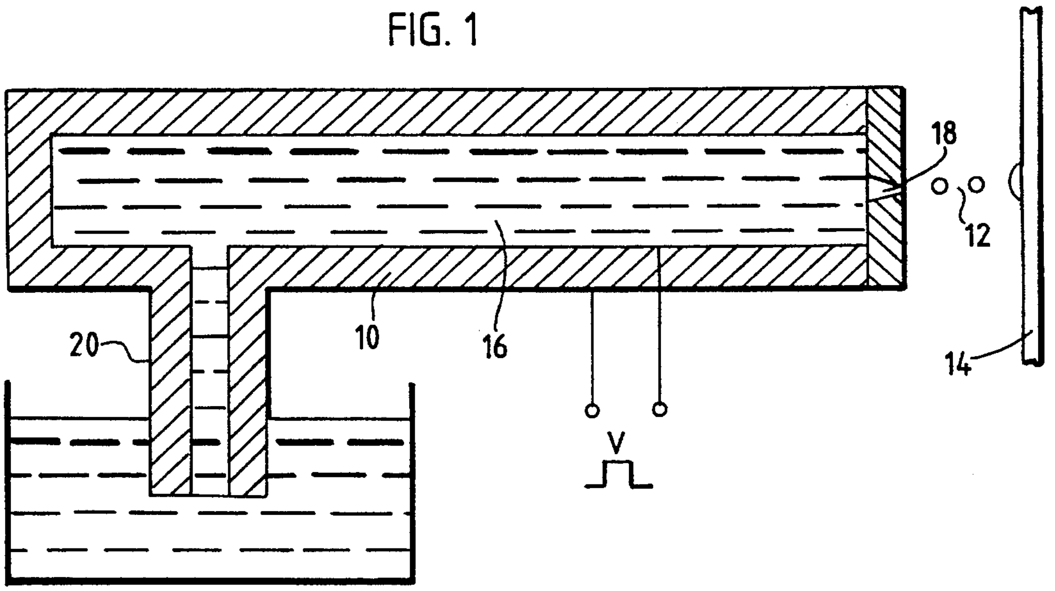
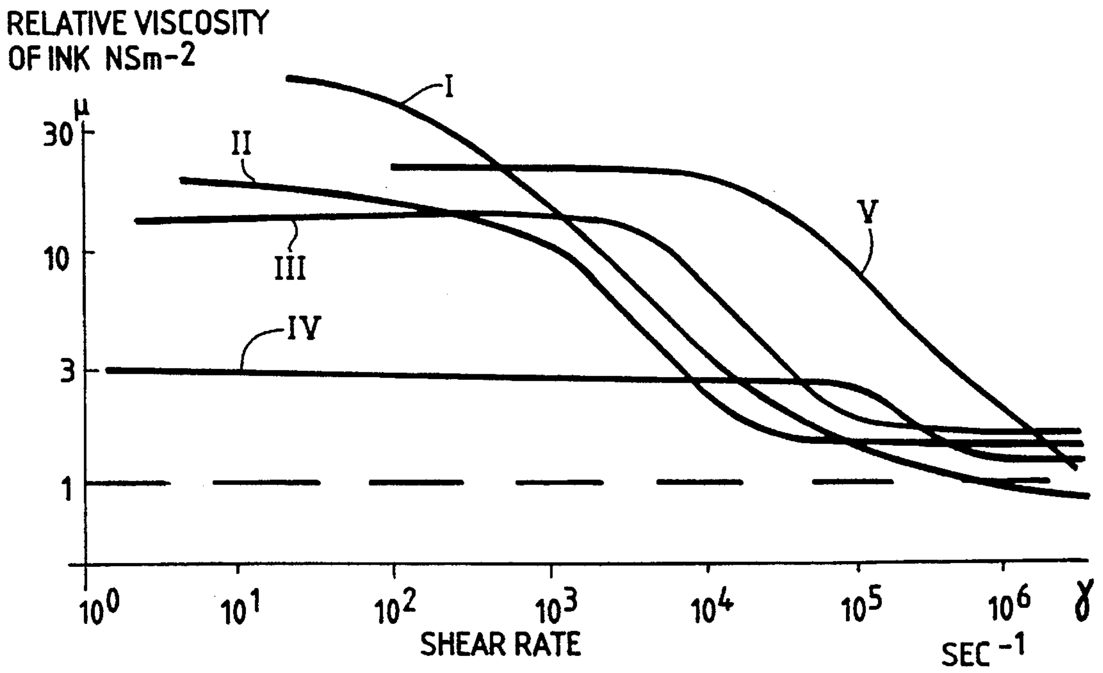
FIG. 2

FIG. 3
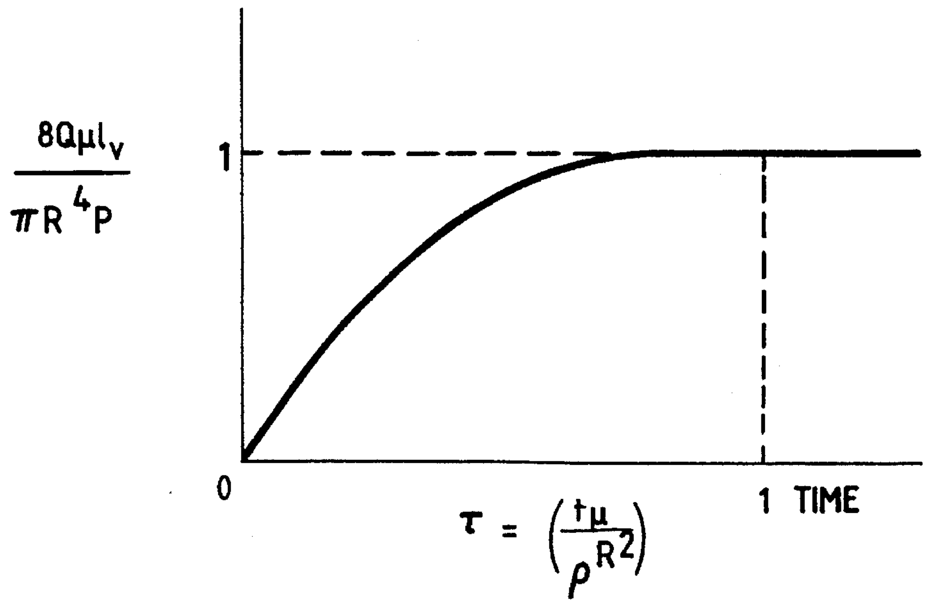
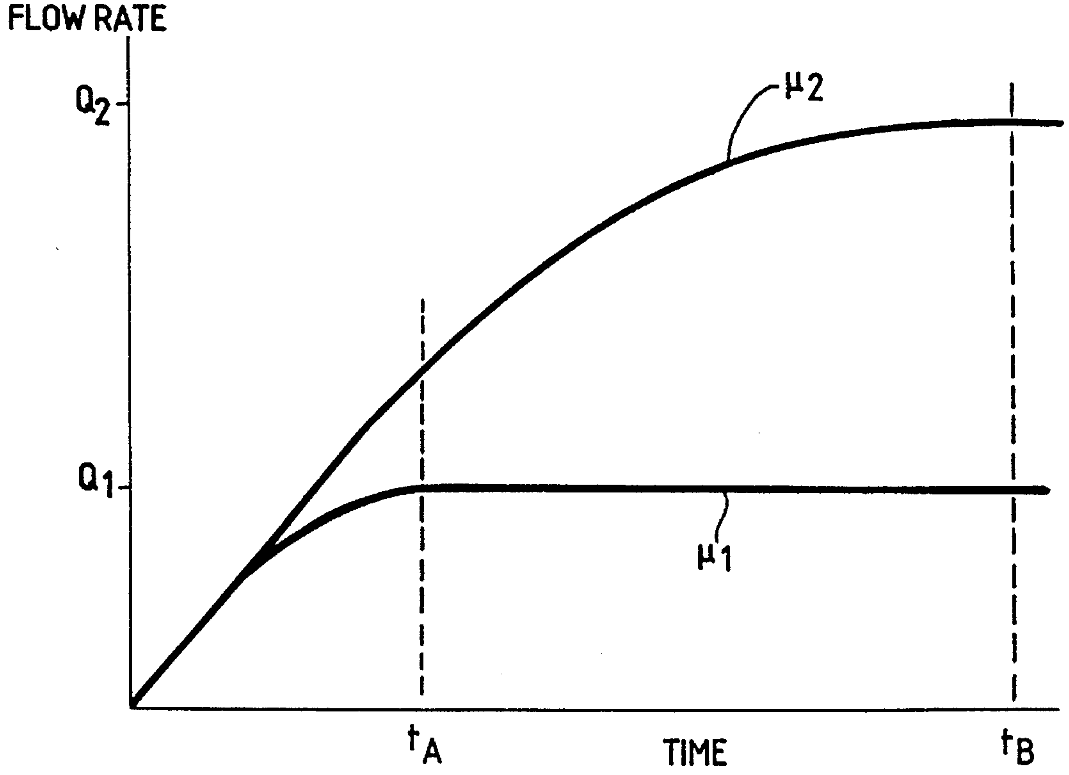
FIG. 4

FIG. 5
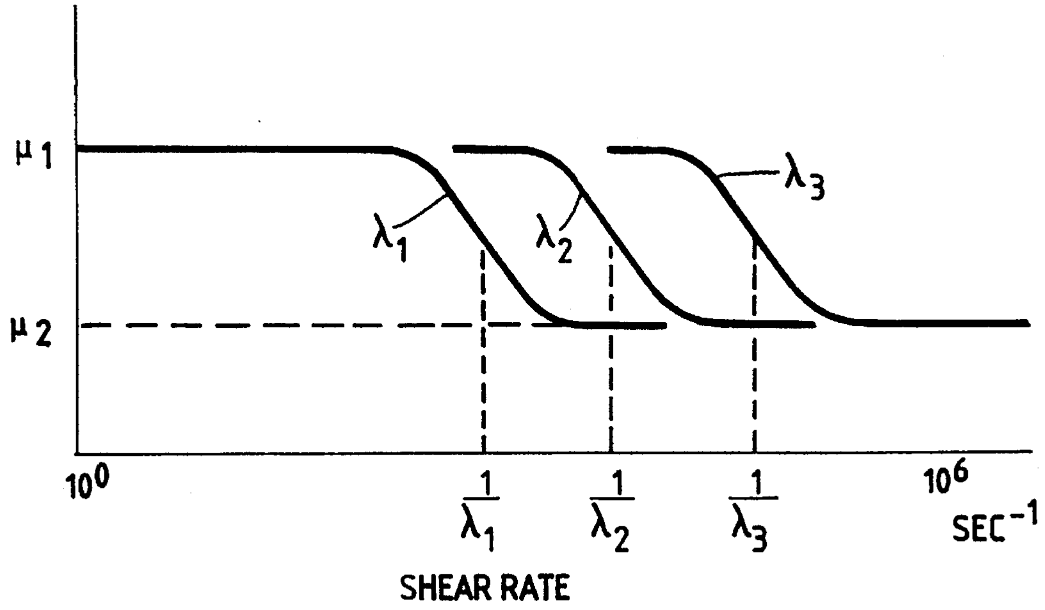
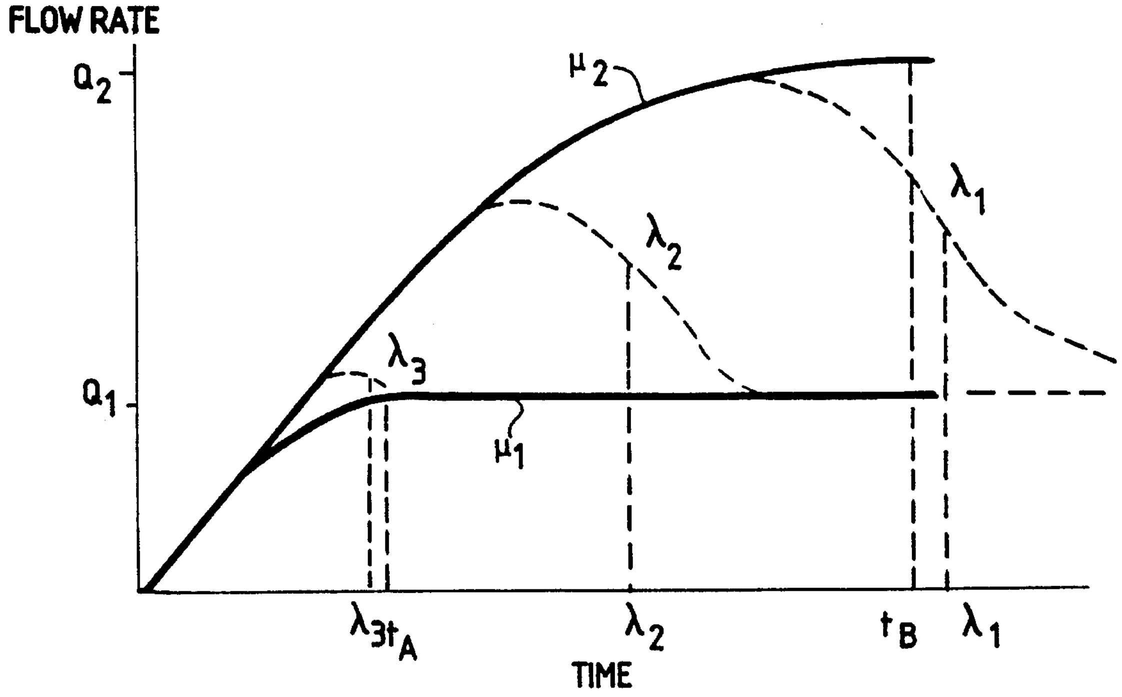
FIG. 6

REDUCED NOZZLE VISCOUS IMPEDANCE

BACKGROUND OF THE INVENTION

This invention relates to pulsed droplet deposition apparatus and more particularly to a method of operating such apparatus having a droplet liquid chamber, a nozzle communicating with said chamber for expulsion of droplets of said liquid therethrough, droplet liquid replenishment means connected with said chamber and energy pulse applying means for imparting pulses of energy to the droplet liquid in the chamber to effect droplet ejection from said nozzle. One familiar form of apparatus of the kind set forth is the drop-on-demand ink jet printer which would normally take the form of a plurality or an array of parallel ink channels having respective nozzles communicating therewith and ink replenishment means connecting the respective channels with a common ink supply.

Such drop-on-demand printers, which eject drops of fluid ink asynchronously in response to piezo-electrically or electro-thermally induced energy pulses, are known. The inks for the printers are selected to form a printed dot having high optical density and controlled spreading characteristics on the printing surface, which is typically uncoated or plain paper.

The inks which satisfy these print requirements consist typically of a solvent and ink solids including colorants, such as dyes or pigments, and possibly other additives. The ink solids may attain as much as 10–15% by weight of the ink composition and also tend to cause the ink viscosity to be enhanced substantially above that of the ink solvent alone.

When the ink viscosity is increased, the viscous impedance to flow of ink in the nozzle during pulsed drop ejection is increased, so that a higher input energy pulse is required to effect drop ejection. Accordingly it is desirable to limit ink viscosity in order to limit the operating energy or voltage. This is desirable because higher voltage requires a more expensive drive circuit or chip and, therefore, increases the manufacturing and operating cost and also reduces the reliability of the printer.

SUMMARY OF THE INVENTION

The present invention consists in the method of operating pulsed droplet deposition apparatus, of the kind referred to, which is characterised by applying said pulses to droplet liquid in said chamber having a relatively low viscosity at high shear rate and a relatively high viscosity at low shear rate, said liquid having a relaxation time constant of the same order or greater than the period of pulses applied thereto and having a characteristic time in said nozzle of the same order or less than the period of said pulses.

The liquid viscosity which controls the viscous impedance in the nozzle, is the viscosity at the shear rate obtaining in the nozzle which is, in the case of an ink jet printer ink, typically in the range $10^5$–$10^7$ $sec^{-1}$. It has been found that an ink, preferably a visco-elastic ink, having a step viscosity characteristic providing viscosity which is high at low shear rate and low at high shear rate can be employed according to the present invention so that it possesses relatively low viscosity during the period of the imparted energy pulse at the end of which the viscosity is tending to increase. The viscous impedance to flow in the nozzle is thus reduced so that the quantity of ink delivered for a given magnitude of pressure pulse is increased.

Preferably, the energy pulse imparting means comprises electrically operated means for displacing a part of a side wall of said chamber. One such electrically operated means comprises a piezo-electrically actuated chamber side wall. The use of a displaceable chamber side wall is to be preferred to an electro-thermal pulse generator which produces a vapour bubble in the droplet liquid because the energy transduction to the liquid is more efficient and there are fewer constraints on the ingredients and properties of the droplet liquid employed.

In alternative forms, the method of the invention is employed to operate a printer having either a plurality of or an array of ink channels having respective nozzles communicating therewith and ink replenishment means connecting the respective channels with a common ink supply.

BRIEF DESCRIPTION OF THE DRAWINGS

FIG. 1 illustrates a drop-on-demand printhead in which a drop of ink is ejected in response to an input electrical energy pulse;

FIG. 2 illustrates the viscosity/shear rate characteristics of several inks having a visco-elastic step viscosity characteristic;

FIG. 3 shows the characteristic of flow rate/time of a Newtonian ink through a nozzle in response to a pressure pulse;

FIG. 4 compares the flow rate/time characteristics respectively of two Newtonian inks having different viscosities through a nozzle in response to a pressure pulse;

FIG. 5 illustrates the viscosity/shear rate characteristic of shear thinning liquids having an Oldroyd characteristic. The characteristic viscosities of these fluids are step viscosities having low shear rate viscosity $\mu_1$, high shear rate viscosity $\mu_2$ and different relaxation time constants $\lambda_1$, $\lambda_2$, $\lambda_3$; and FIG. 6 illustrates the flow/time characteristics through a nozzle similar to that of FIG. 4, in response to a pressure pulse, employing the fluids of FIG. 5.

DESCRIPTION OF THE PREFERRED EMBODIMENTS

The invention will be described by way of example.

The illustration presented in FIG. 1 shows a single channel drop-on-demand printhead 10, which ejects drops of ink 12 in response to electrical pulses. The drops are projected onto the print surface 14 to form a printed image.

The channel is terminated with a nozzle 18 for ink droplet ejection at one end and an ink supply 20 for ink replenishment at the other end and is filled with ink 16. The ink is ejected by generating an acoustic pressure pulse in the ink applied for a short duration of typically 2–20 μsec at the nozzle 18. The magnitude of the pressure pulses is sufficient to overcome the viscous and inertial impedances of the ink 6 in the nozzle 18 and so to eject a droplet of ink through the nozzle. The flow reverses at the end of the pulse causing droplet break-off.

Various forms of drop-on-demand printhead actuator are known in the art to develop a suitable pressure pulse in response to an applied electrical pulse. One form, already mentioned, incorporates a piezo-electric actuator in part of one wall of the channel, which is displaced inwardly or outwardly of the channel in response to the voltage pulse. The pressure pulse may also, as mentioned, be induced by a bubble of vapour generated in the ink channel by a heating element in the channel wall in response to an electrical impulse.

The piezo-electric actuator is preferred for the working of this invention, because it places fewer constraints on the ingredients and properties of the ink. Accordingly the ink can be designed to have desirable rheometric characteristics in the nozzle or to control dot formation and spreading on the print surface. The piezo-electric actuator is also preferred because it leads to a more energy efficient method of transduction: of the applied electrical energy some 50–60% may be developed as pressure energy developed in the ink and the actuator: and in turn some 50–60% of the pressure energy is available as an impinging acoustic pressure wave for droplet ejection at the nozzle. Thus the energy, which is useful for droplet ejection using a piezo-electric actuator is 25–35% of the applied energy, whereas the corresponding efficiency when employing an electrothermal pulse generator which produces a vapour bubble is generally 1–2% or less.

A small fraction of the acoustic pressure energy applied to the nozzle is effectively employed in developing kinetic energy for drop delivery onto the paper. The residual fraction is used to overcome losses including the condensation of the acoustic wave and the inertial, viscous and surface tension impedances in the nozzle. Generally the viscous impedance represents the dominant impedance. It is desirable to reduce these nozzle impedances, so that the ratio of the drop kinetic energy to the applied electrical energy is maximized.

The present invention is concerned with the use of inks in a drop-on-demand printhead, which suitably reduce the viscous impedance of ink flow ejected from the nozzle. The electrical energy applied to the printhead can then ostensibly be reduced in proportion to the viscous impedance, so that inks which allow a reduction in the viscous impedance enable the printhead to be operated at lower input energy or voltage. A lower operating voltage is associated with lower cost drive electronic chips as well as higher operating reliability.

The inks employed in a drop-on-demand printer are also usually chosen to print on the print surface, (which is typically uncoated or plain paper), a printed dot having high optical density and controlled spreading characteristics. Such inks typically are, as referred to earlier, constituted of a solvent and ink solids including colorants and resins, which amount to 10–15% by weight of the ink composition. This amount of ink solids will generally enhance the viscosity of ink substantially above the viscosity of the ink solvent alone. It is preferable for the ink characteristics, which control the quality of the printed dot, to be obtained without significantly increasing the operating voltage.

The inks illustrated in FIG. 2 are non-Newtonian, and may also be visco-elastic inks, whose viscosity at a lower shear rate in the range $10$–$10^3$ $sec^{-1}$ is 3–30 times the viscosity of the solvent alone due to the presence of the ink solids: and at a relatively high shear rate of $10^4$–$10^7$ $sec^{-1}$ corresponding to the state of flow in the nozzle, falls to a lower viscosity of 1–3 times the viscosity of the solvent. The course of the viscosity/shear rate of typical inks is illustrated in FIG. 2.

It has been found that inks having the step viscosity characteristics illustrated, despite their relatively high viscosity and stability at low shear rate due to their solids content; can be ejected from the nozzle in response to the actuating pressure impulse in a manner characteristic of the relatively low viscosity which obtains at high shear rate. Thus the viscous impedance for the inks having a shear thinning step characteristic is reduced.

The behaviour of these inks is explained by the following paragraphs considering first the behaviour of Newtonian inks (that is inks having a constant viscosity/shear rate characteristic in the operating range) in a nozzle in response to a pressure impulse. Secondly the behaviour of an Oldroyd fluid (that is a fluid having a mathematically simplified shear thinning in the form of a step viscosity/shear rate) in a nozzle in response to a pressure pulse is presented.

FIG. 3 illustrates the flow rate Q through a nozzle of radius R and viscous length $l_v$ when a fluid flows through the nozzle in response to a pressure impulse P acting for the period t. The fluid has density $\rho$ and a viscosity $\mu$ (which is Newtonian, such that viscosity is constant and independent of shear rate).

The flow rate in FIG. 3 is initially zero and rises in response to a step pressure impulse at a rate limited by the inertia of a fluid plug in the nozzle. As time develops viscous shear develops from the walls, so that the flow profile progressively develops from plug flow to a parabolic viscosity controlled flow profile, which subsequently remains uniform until the pressure impulse ceases or reverses.

For simplicity the progressive flow development is presented in FIG. 3 non-dimensionally: thus after non-dimensional time related parameter $$\tau = \frac{t\mu}{\rho R^2} = 1$$

the non-dimensional flow rate related parameter $$\frac{8Q\mu l_v}{\pi R^4 P}$$

has attained a steady state of unity. This result and the family of flow profiles that apply at times $\tau$ is a result that has been known in the open literature for almost sixty years.

Hereinafter, reference is made to the "characteristic time" of the flow profile employed in the method of the invention and is the value in the above equation of t when $\tau$=1 and is given by $$t = \frac{\rho R^1}{\mu}.$$

This is the time taken for constant flow rate to be attained.

Suppose that two sample inks have respectively a higher viscosity $\mu_1$ and a lower viscosity $\mu_2$, both inks being Newtonian. A comparison of the flow rates of these two inks for the same pressure pulse and in the same nozzle is illustrated in FIG. 4. The two inks have the same inertial impedance, so that the flow rate commences to rise at the same rate for both inks. A shear stress propagates from the wall earlier in the case of the more viscous ink, so that after $$t_A = \frac{\rho R^2}{\mu_1}$$

the ink has attained a constant flow rate $$Q_1 = \frac{\pi R^4 P}{8\mu_1 l_v}$$

and the flow profile in the nozzle with this ink is then uniform. The flow rate attained by the less viscous ink after time $t_A$, however, is already greater. At this time the fluid plug is still accelerating and the effect of the ink viscosity is small.

However, after time $$t_B = \left( \frac{t_A \mu_1}{\mu_2} \right)$$

the lower viscosity ink has reached a uniform velocity, when its flow profile is also parabolic.

It will be evident that, if the duration of the pressure pulse is of magnitude $t_A$ or less, the total flow delivered by the pulse (obtained by integrating under the curves for $\mu_1$ and $\mu_2$ up to the limit of the pulse period) is approximately the same: but if the pulse duration is of a magnitude approximately $t_B$, a substantially greater volume of the lower viscosity ink $\mu_2$ is delivered compared with the volume of the higher viscosity ink $\mu_1$.

The characteristics of a family of three Oldroyd fluids is illustrated in FIG. 5. An Oldroyd fluid is a mathematically idealised, shear thinning fluid having a step viscosity characterised by the relationship $$\mu = \frac{\left( 1 + \frac{\mu_2}{\mu_1} \dot{\gamma}\lambda \right)}{(1 + \dot{\gamma}\lambda)} \mu_1$$

in which $\dot{\gamma}$ is the shear rate:

$\lambda$ is the relaxation time constant of the ink

It will be seen that at low shear rates ($t \to 0$), $\mu = \mu_1$ and at high shear rates ($t \to \infty$), $\mu = \mu_2$. Curves for different values of the relaxation time constant $\lambda_1 \lambda_2 \lambda_3$ are illustrated. The Oldroyd fluid has a mathematically simplified step viscosity characteristic such that the flow rate in response to a step pressure pulse can be calculated.

The results of this calculation are illustrated in general terms in FIG. 6. Each of the Oldroyd fluids chosen for the purposes of calculation has a viscosity at low shear rate of $\mu_1$ corresponding to the higher viscosity as discussed with reference to FIG. 4; and a viscosity at high shear rate corresponding to the lower viscosity ink discussed likewise.

The three fluids differ in respect of their relaxation rate. The fluid labelled $\lambda_3$. For example, undergoes viscosity reduction at a relatively high shear rate, so that, in other words, it has a relatively short relaxation time constant. The curve labelled $\lambda_1$ on the other hand has a relatively long relaxation time constant, so that its viscosity varies from $\mu_1$ to $\mu_2$ as shear rate increases at a lower shear rate. $\lambda_2$ has an intermediate property.

Considering FIG. 6, we see that fluid $\lambda_3$ (having a short time constant) behaves like a fluid characteristic viscosity $\mu_2$ in short periods, but relaxes to characteristic viscosity $\mu_1$ rapidly. After period $t_A$ it can be regarded as a Newtonian fluid of viscosity $\mu_1$.

An Oldroyd fluid $\lambda_1$, however, has the longer relaxation time constant. It performs like a fluid of characteristic viscosity $\mu_2$ for a greater period and, then subquently behaves as if its characteristic viscosity is $\mu_1$ after period $t_B$.

Thus when the pulse duration is $t_B$, the fluid having relaxation time constant $\lambda_1$, permits a greater volume of fluid to flow (obtained by integrating under curves $\mu_2$, $\lambda_1$) than do fluids $\lambda_2$ or $\lambda_3$.

It is thus apparent that, when the ink is a shear thinning fluid having a step viscosity characteristic including a low shear rate higher viscosity $\mu_1$ and a high shear rate lower viscosity $\mu_2$ and a relaxation time constant corresponding to the step of $\lambda$:

1. If the relaxation time constant is of the same order or greater than the duration of the pressure pulse applied to the nozzle: and
2. If the characteristic time $$\frac{\rho R^2}{\mu_2}$$

is of the same order or less than the duration of the pressure pulse:

then the volume of ink ejected from the nozzle in response to the pressure pulse is greater than would be obtained from an ink having viscosity corresponding to the lower shear rate viscosity $\mu_1$.

Although this has been described by reference to the mathematically simplied Oldroyd form of shear thinning, it can be seen that comparable reduction in viscous impedance is obtained using suitably selected nozzles and actuating pressure pulses with inks whose characteristics are illustrated in FIG. 2.

This reduction in viscous impedance may be understood to result from the properties of the fluid, whereby the fluid initially responds to the pressure pulse in plug flow so that it inhibits the development of shear momentum through the boundary layer adjacent the nozzle walls, that is it inhibits the development of viscous flow for approximately the relaxation time constant of the fluid. It will, therefore, be concluded that these ink properties may be adopted in a drop-on-demand printer to reduce the viscous impedance of flow in the nozzle during drop ejection and thus to reduce the actuation voltage. Such inks also accordingly reduce operating voltage and therefore the cost of the electronic drive chips and improve the operating reliability of the printers.

It is also concluded that inks having increased solids content, whereby the printed dot obtains increased optical density and incorporates spreading control characteristics, despite enhanced viscosity at low shear rate, can be adapted for use in drop-on-demand printers without the disadvantage of increased actuating voltage or energy. This is achieved by the formulation of ink having a step viscosity characteristic satisfying the relaxation time constant and characteristic time criteria as described. The employment of visco-elastic inks is to be preferred because in such inks the dispersant if, as is usual, it is of higher density than the solvent, will be resistant to settling and the ink will accordingly be suitably stable.

The Oldroyd fluid as already described, and the behavioural equation of which is given above, is a mathematically idealised fluid viscosity characteristic which has a single relaxation time constant $\lambda$. This means that the particles or polymers which it comprises are homogeneous. Real fluids have a spectral distribution of time constants. One widely used empirical relationship for shear thinning fluids is the Cross equation $$\frac{\mu - \mu_2}{\mu_1 - \mu_2} = \frac{1}{1 + K\dot{\gamma}}$$

which can be re-written as

-continued $$\frac{\mu}{\mu_1} = \frac{1 + k\frac{\mu_2}{\mu_1}\dot{\gamma}^n}{1 + k\dot{\gamma}^n}$$

which bears close resemblance to the Oldroyd equation and from which it is seen that where the shear rate $\dot{\gamma}^n$ is such that $$K = \frac{1}{\dot{\gamma}^n} \text{ the viscosity } \mu = \frac{\mu_2 + \mu_1}{2}$$

and $K^{i/m}$ is an effective time constant.

A black ink suitable for use in the method of the invention in conjunction with a nozzle having a radius in the range 5–20 μm and a pulse duration in the range 2 to 20 microseconds at an operating temperature of 50° C. was prepared by dissolving 4 g of ACRYLOID DM 55 acrylic copolymer resin dispersant (Rohm and Haas) in 20 ml of warm (50°–60° C.) water-free tripropylene glycol monomethyl ether (TPM) while stirring and then, while maintaining the temperature and with additional stirring adding 2 g of N330 carbon black (Witco). To the mixture so formed was added a warm (60°–80° C.) solution of 1.75 g of an ethylene/vinyl acetate copolymer containing 40% by weight vinyl acetate and marketed by Du Pont as ELVAX W in 10 ml of TPM and the whole was stirred for a further 72 hours and then allowed to cool and diluted to 50 ml with more TPM.

Red and blue inks likewise suitable with nozzles having a radius in the same range of 5–20 μm and a pulse duration in the same range of 2 to 20 microseconds at an operating temperature of 50° C. were also prepared. The red ink was prepared following the same procedure as that of the black ink but using 2 g of ACRYLOID DM-55, 2 g of ELVAX W and, as the dyestuff, 1.8 g of Irgalite Red 2 BS RBS (Ciba Geigy). The blue ink was prepared following the same procedure and using the same quantities of materials as for the red ink but using 2 g of Heliogen Blue L6700 (BASF) as the dyestuff.

We claim:

1. A method of depositing drops of liquid, comprising the steps of providing pulsed droplet deposition apparatus having a liquid chamber, a nozzle communicating with said chamber for expulsion of liquid droplets from the chamber therethrough, liquid replenishment means connected with said chamber and energy pulse applying means for imparting pulses of energy to the liquid in the chamber to effect droplet ejection from said nozzle, and applying through said energy pulse applying means pulses of a duration to the liquid in said chamber, said liquid having a first viscosity at high shear rate and a second viscosity higher than said first viscosity at low shear rate, said liquid having a relaxation time constant approximately equal to or greater than the duration of pulses applied thereto and having a characteristic time in said nozzle approximately equal to or less than the duration of said pulses.

2. The method claimed in claim 1, characterised by employing energy pulse applying means in which electrically operated means are actuable to displace at least part of a side wall of said chamber thereby to impart a pressure pulse to liquid in the chamber.

3. The method claimed in claim 1, characterised by employing visco-elastic liquid.

4. A method of depositing drops of liquid, comprising the steps of providing pulsed droplet deposition apparatus comprising an array of parallel liquid channels, respective nozzles communicating with said channels for expulsion of droplets of liquid therethrough, liquid replenishment means connected with said channels and energy pulse applying means for imparting pulses of energy selectively to said channels to effect droplet ejection from said nozzles, and applying through said energy pulse applying means pulses of a duration to the liquid in said channels, said liquid having a first viscosity at high shear rate and a second viscosity higher than said first viscosity at low shear rate, said liquid having a relaxation time constant approximately equal to or greater than the duration of pulses applied thereto and having a characteristic time approximately equal to or less than the duration of said pulses.

5. The method claimed in claim 4, characterised by employing energy pulse applying means in which electrically operated means are actuable selectively to displace part at least of respective channel side walls to impart said pulses of energy.

6. A method of ink jet printing comprising the steps of providing in an ink chamber having a nozzle for expulsion of droplets from the chamber therethrough, an ink having a first viscosity at high shear rate and a second viscosity higher than said first viscosity at low shear state and having an associated relaxation time constant; and applying pulses of energy to ink in the chamber to effect droplet ejection from said nozzle, said pulses having a duration which is approximately equal to or less than said relaxation time constant.

7. The method claimed in claim 6, wherein said ink is viscoelastic.

8. The method claimed in claim 6, wherein said pulses of energy are applied through displacement of at least part of a wall of said chamber.

* * * * *